United States Patent
Novelle et al.

(10) Patent No.: US 7,525,052 B2
(45) Date of Patent: Apr. 28, 2009

(54) MULTIFUNCTION SWITCH ASSEMBLY FOR POWER ADJUSTED VEHICLE PASSENGER SEAT

(75) Inventors: Anthony J. Novelle, Glen Ellyn, IL (US); Claus D. Raddatz, Bolingbrook, IL (US); Steven J. Long, Schaumburg, IL (US); Kenneth F. Tomerlin, Darien, IL (US)

(73) Assignee: Delphi Technologies, Inc., Troy, MI (US)

( * ) Notice: Subject to any disclaimer, the term of this patent is extended or adjusted under 35 U.S.C. 154(b) by 1908 days.

(21) Appl. No.: 09/775,780

(22) Filed: Feb. 2, 2001

(65) Prior Publication Data

US 2002/0104742 A1 Aug. 8, 2002

(51) Int. Cl.
*H01H 25/00* (2006.01)
*H01H 13/70* (2006.01)
(52) U.S. Cl. .................................. 200/5 R; 200/5 A
(58) Field of Classification Search ............... 200/5 R, 200/17 R, 18, 517, 1 B, 5 A, 5 B, 5 C, 5 E
See application file for complete search history.

(56) References Cited

U.S. PATENT DOCUMENTS

| 4,918,264 | A | * | 4/1990 | Yamamoto et al. | 200/5 R |
| 5,021,614 | A | * | 6/1991 | Sasaki et al. | 200/5 R |
| 5,623,134 | A | * | 4/1997 | Hayakawa | 200/5 R |
| 5,844,182 | A | * | 12/1998 | Hirano et al. | 200/5 R |
| 6,252,183 | B1 | * | 6/2001 | Shirai | 200/5 R |

* cited by examiner

*Primary Examiner*—Anh T Mai
(74) *Attorney, Agent, or Firm*—David P. Wood

(57) ABSTRACT

A multifunction six-way switch assembly having a plurality of sealed dome type or membrane switches disposed on a circuit board and arranged in pairs such that a single knob actuator may be slidably moved in opposite directions along a first axis for actuating either one of a first pair of membrane switches and slidably moved in opposite directions along a second perpendicular axis for actuating either one of a second and third pair of membrane switches in the same direction for controlling seat adjustment servomotors. Rotation of the single-knob actuator about a third axis normal to the first two axes results in a mutually opposite direction of actuation of the second and third pair of membrane switches. The six-way actuator has only one portion extending externally of the switch housing for attachment of the user knob.

8 Claims, 3 Drawing Sheets

MULTIFUNCTION SWITCH ASSEMBLY FOR POWER ADJUSTED VEHICLE PASSENGER SEAT

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to manually operated switches for controlling servomotors to provide powered adjustment of the elevation, fore and aft position and tilt of a vehicle passenger seat.

In the design of present day production motor vehicles, it is commonplace to provide power adjusted seats and seat backs and to provide a set of switch knobs or buttons organized in a tactilely discernable pattern conveniently placed for manual operation by the occupant of the seat. Typically, the actuator knobs or buttons are situated in a pattern resembling the arrangement or orientation of the seat and back support and are located on the side of the seat or in the adjacent arm rest of the vehicle interior door panel. It has become acceptable in the marketplace to provide a separate knob configured as the end view of a seat and slidably moveable horizontally and vertically on separate axes and rotatable about a horizontal axis transverse to the seat to correlate for the user the desired direction of motion of the seat adjustment with the direction of motion of the seat adjustment switch knob.

It is known to have the adjustment knob for the seat portion extending from the side of the seat and elongated in the fore and aft direction to give the user the blind tactile identification of the knob as distinguished from a vertically elongated knob for actuation of the desired adjustment of the seat back support.

In order to provide two-axis translation movement and also a third axis rotatable movement to the seat adjustment knob for separate multifunction control of the seat adjustment, it has been required to provide three separate sets of switches actuated by the knob, with a separate actuator engaged by the knob for a set of switches for each direction of desired movement of the seat. Thus, the switch unit of the type mounted in the seat with the knob projecting outwardly therefrom has required three separate actuators extending exteriorly of the switching unit for engaging the single user actuator knob. This arrangement has thus provided for multiple openings in the switch housing for the actuators to extend outwardly therefrom; and, it has resulted in problems in service due to moisture and foreign matter entering the openings in the switch casing and causing deterioration of the switches within the switch unit housing.

Known multifunction switching arrangements for vehicle passenger seat adjustment have employed plunger-type actuators extending from the switch housing, with each actuator engaging a separate switch blade actuation member of a snap action switch. The switch contacts were exposed to the foreign matter and moisture entering the switch housing through the actuator openings and subject to deterioration therefrom and to interference with the operation of the snap acting switch contact blade mechanism.

Thus, it has been desired to provide a switching assembly and method of operating same which is reliable and low in cost for a multifunction user control of powered adjustment of vehicle passenger seat and to protect same against moisture and foreign particle entry within the switch housing and to thus protect the switching contacts from ambient contamination. This has been particularly desirable where the switching of the powered seat adjustment motors may be accomplished through relays and the current requirements for the user operated switch are reduced to levels not requiring solid contact, snap acting blade type switches.

BRIEF SUMMARY OF THE INVENTION

The present invention provides a solution to the above-described problem of providing a multifunction or six-way switching assembly for user actuation to control powered vehicle passenger seat adjustment and provides a solution which is reliable, robust and relatively low in manufacturing cost and provides a single actuator extending from the switching housing for attachment of the user control knob. The six-way powered seat adjustment switch of the present invention employs flexible membrane sealed contacts which provide substantially improved protection from contamination and compact arrangement on a circuit board. A lever is pivotally mounted adjacent each of three pairs of membrane switches; and, each lever has a distal portion actuated by a separate portion of a unitary actuator mounted for sliding movement in opposite directions along orthogonal axes and for pivotal movement about a third axis normal to the first and second axis. The unitary actuator has a distal portion extending outwardly of the switch housing for attachment of the user manipulated knob.

User movement of the six-way adjustment knob in either vertically upward or downward direction causes one lever to pivot and actuate either one of a first pair of switches; sliding movement of the actuator horizontally in either forward or backward direction with respect to the vehicle seat causes the other two levers to each pivot in the same direction actuating one of each of a second and third pair of membrane switches; and, rotation of the user adjustment knob and actuator about the third axis perpendicular to the first and second axes causes the second and third pairs of switches to be actuated in an opposite direction with respect to each other.

The present invention thus provides a switching assembly for controlling passenger seat adjustment motors in a vehicle which has the user manipulated actuator knob attached to a single actuator extending exteriorly of the switch housing and which employs relatively low actuation force sealed membrane switches for effecting servomotor circuit switching functions.

DETAILED DESCRIPTION OF THE INVENTION

Figure 1:
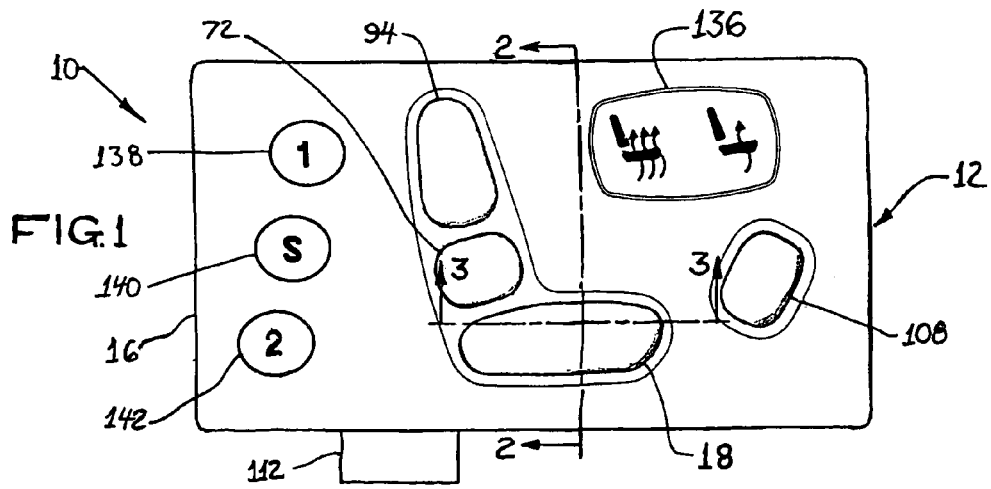
FIG. 1 is a top view of the switch assembly of the present invention showing the ergonomic arrangement of the switch knobs and buttons.

Referring to FIGS. 1 through 4, the switching unit or assembly is indicated generally at 10 and includes a housing indicated generally at 12 which includes a base or lower shell 14 and a cover or upper shell 16 and a user actuated knob 18 for controlling operation of the servomotors for adjusting the relative position of the passenger or driver seat.

A support or platform member 20 is provided with apertures 22, 24, 26 therethrough, each having respectively formed in opposite sides thereof from the undersurface of the platform 20 slots respectively 28, 30, 32 for mounting therein a plurality of levers.

Figure 4:
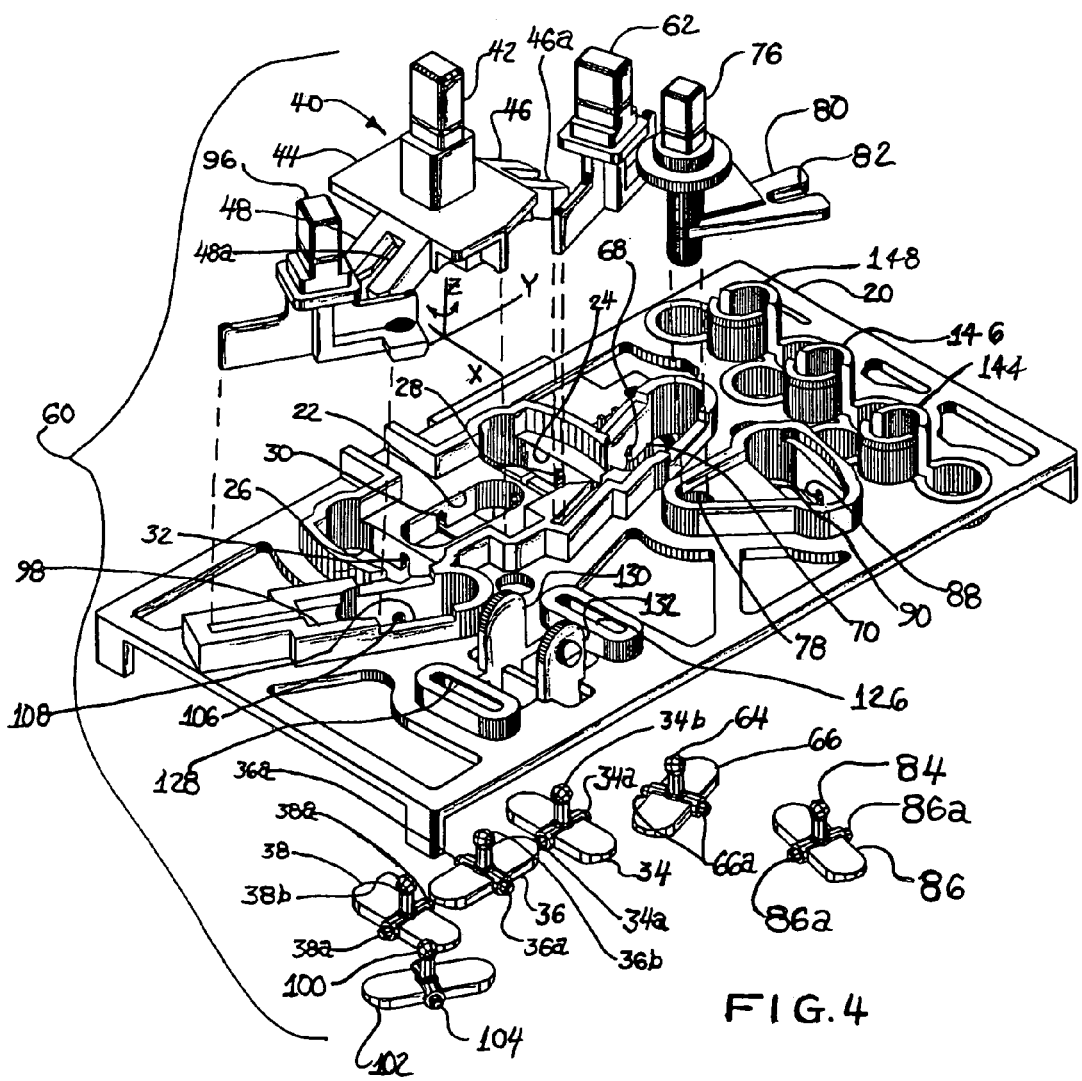
FIG. 4 is an exploded view of the subassembly of the support platform and actuators and levers of the unit of FIG. 1; and, FIG. 5 is an exploded view of the complete assembly of FIG. 1.
Figure 2:
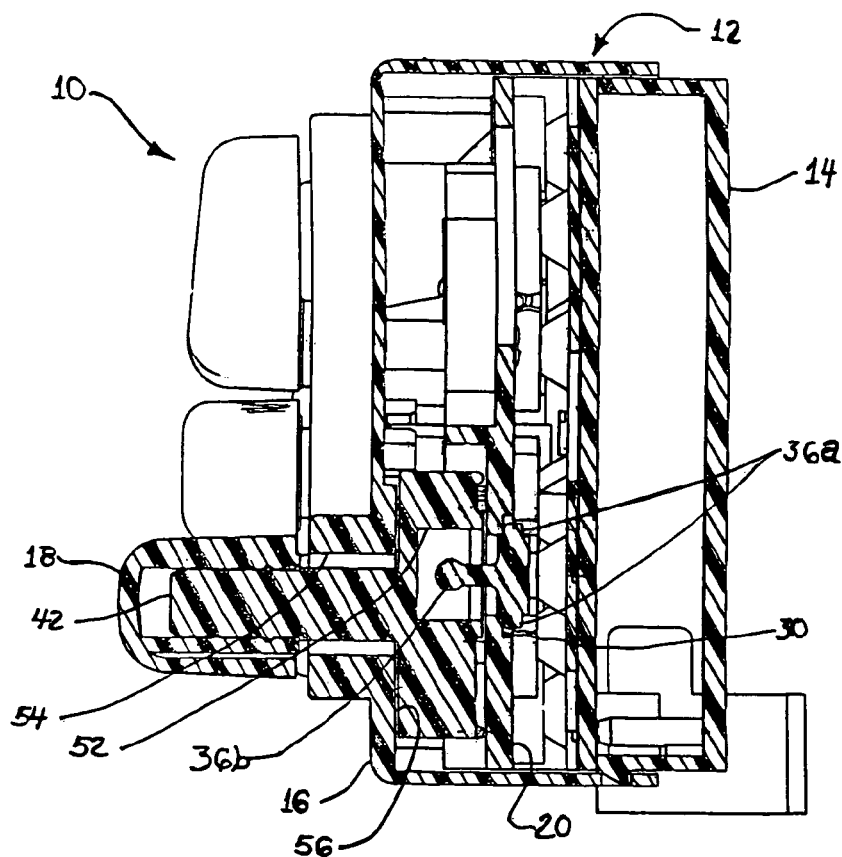
FIG. 2 is a section view taken along section-indicating lines 2-2 of FIG. 1.
Figure 3:
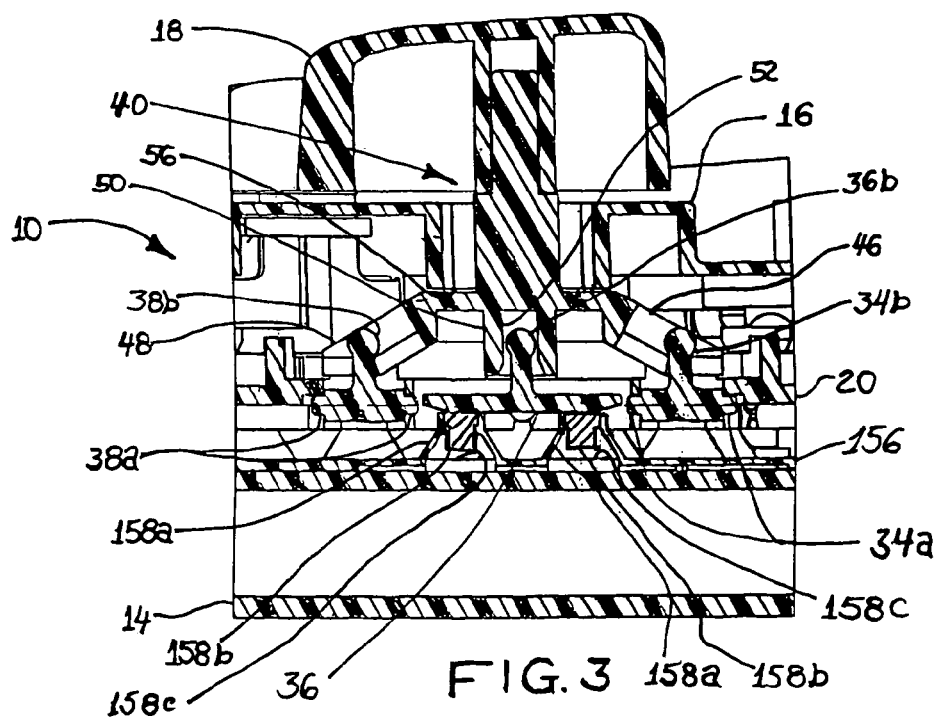
FIG. 3 is a section view taken along section-indicating lines 3-3 of FIG. 1.

Referring to FIGS. 2, 3 and 4, a plurality of levers 34, 36,38 each have a pair of half axles or trunnions extending therefrom in opposite directions and denoted respectively 34a, 36a, 38a. The trunnion or half axles 34a, 36a, 38a are oriented respectively to be received and retained in slots 28, 30, 32 respectively by insertion and snap locking therein from the underside of the platform 20. Each of the levers 34, 36, 38 has a generally flat paddle configuration on opposite sides of the half axles or trunnions; and, each lever also has extending therefrom in a generally upward direction, at right angles to the axis of the trunnions, a distal actuator portion denoted respectively 34b, 36b, 38b. In the presently preferred practice of the invention, the actuators 34b, 36b, 38b each have the end thereof 34b, 36b, 38b formed in a ball-like or substantially spherical configuration.

An actuator member denoted generally at 40 has an upper portion or tower 42 extending upwardly from a platform portion 44 which has extending outwardly therefrom in opposite directions bifurcated extension portions 46, 48. A downwardly extending portion 50 is centrally located on the undersurface thereof; and, portion 50 has a slot 52 formed therein which is elongated in the transverse direction of the housing as shown in FIG. 2.

The actuator 40 is disposed within the upper housing shell 16 and the tower portion 42 extends outwardly through an opening 54 formed in the upper surface of the housing shell 16. The ball-like actuator surface 36b of lever 36 is slidably engaged by the sides of the groove 52 as shown in FIG. 3; and, the elongation of slot 52 provides for clearance of the ball-like surface 36b.

The bifurcated extensions 46, 48 respectively engage the ball-like actuator surfaces 34b, 38b on levers 34 and 38 for effecting pivotal movement of the levers and lost motion sliding movement with respect thereto as will be described hereinafter.

The base 44 of the actuator 40 is captured for sliding movement in two perpendicular horizontal directions and for pivotal movement about a vertical axis normal thereto by the undersurface 56 of housing shell 16 and the upper surface of platform 20.

It will be understood that the slot 46a formed by bifurcating the actuator portion 46 and slot 48a formed by bifurcating actuator portion 48 respectively have received therein the ball-like portion 34b of lever 34 and the ball-like actuator portion 38b of lever 38.

In operation, sliding movement of actuator 40 along the direction parallel to the X axis as shown in FIG. 4, causes the slots 46a, 48a to move the actuator surfaces 34b, 38b in a common direction and cause levers 34, 38 to pivot together in the same direction about their respective trunnions. The slot 52 permits lost motion sliding movement of actuator 40 with respect to actuator surface 36b of lever 36 when actuator 40 is moved in the X direction.

Sliding movement of the actuator 40 in a direction parallel to the Y axis causes the actuators 34b, 38b to slide respectively in slots 46a, 48a in lost motion engagement; and, the engagement of actuator portion 36b in slot 52 causes lever 36 to pivot about its trunnions with levers 34, 38 remaining in the neutral position.

If actuator 40 is pivoted either clockwise or anti-clockwise about the Z axis as shown in FIG. 4, movement of the extensions 46, 48 is effected simultaneously in opposite directions causing slots 46a, 48a to engage actuators 34b, 38b and cause the levers 34, 38 to pivot about their trunnions in opposite directions. Thus, levers 34, 38 may be either pivoted in a common direction or in opposite directions depending upon whether actuator 40 is pivoted about the Z axis or moved in a sliding manner in a direction parallel to the X axis. Lever 36 is operated only by movement of the actuator 40 in the direction parallel to the X axis, because actuator portion 36b is disposed on the Z axis and is thus at the pivot center of actuator 40 thereby permitting pivotal movement of actuator 40 without effecting movement of the actuator portion 36b.

The subassembly of the actuator 40 platform 20 and levers 34, 36, 38 is illustrated in exploded view and denoted by reference numeral 60 in FIG. 4.

With reference to FIGS. 1 and 4, an auxiliary actuator 62 is provided for actuation of an adjustment motor for the lumbar region of the seat back support and is operative to engage actuator 64 of lever 66 which is pivotally mounted about its trunnions 66a in a slot 68 formed in the lower surface of the platform in opening 70. Actuator 62 is slidably moveable in the opening 70 for effecting pivotal movement of lever 66. A lumbar actuator knob 72 is provided on the exterior of the housing 12 and engages the actuator 62 which extends through an opening 74 (see FIG. 5) in the upper housing shell 16.

Another actuator 76 is pivotally mounted through an aperture 78 formed in the platform and has a lever arm 80 extending therefrom with a slot 82 formed therein which engages an actuator surface 84 of lever 86 pivoted about trunnions 86a in a groove 88 formed in the lower surface of platform 20 in the sides of an opening 90 formed in the platform. Actuator 76 extends through an opening 92 formed in the housing upper shell 16 and is engaged by a user manipulated knob 94. Pivotal movement of the knob 94 about the axis of the actuator through aperture 78 causes slot 82 to move actuator surface 84 and pivot lever 86 about its trunnions.

It will be observed that the actuator knobs 18, 72, 94 are disposed in a pattern tactilely discernible by the user as an arrangement corresponding to the positions of the various seat and upright back portions which it is desired to adjust.

An auxiliary actuator member 96 is disposed to extend outwardly through opening 98 in housing 16; and, actuator 96 is received for sliding movement in opening 98 formed in platform 20. The actuator 96 engages a ball-like actuating surface 100 formed on lever 102 which has a pair of oppositely extending trunnions 104 provided thereon which are pivotally received in a slot 106 formed in the undersurface of the platform, with the lever 102 pivotally received in an opening 108 formed in the platform 20. Sliding movement of actuator 96 effects pivotal movement of lever 102 about its trunnions 104. The actuator 96 extends outwardly through an aperture 98 in housing shell 16 and has provided thereon a user operating knob denoted by reference numeral 108. The actuator 96 is actuated by user movement of the knob 108 when it is desired to adjust the position of the brake pedal to facilitate driver operation of the brakes.

Figure 5:
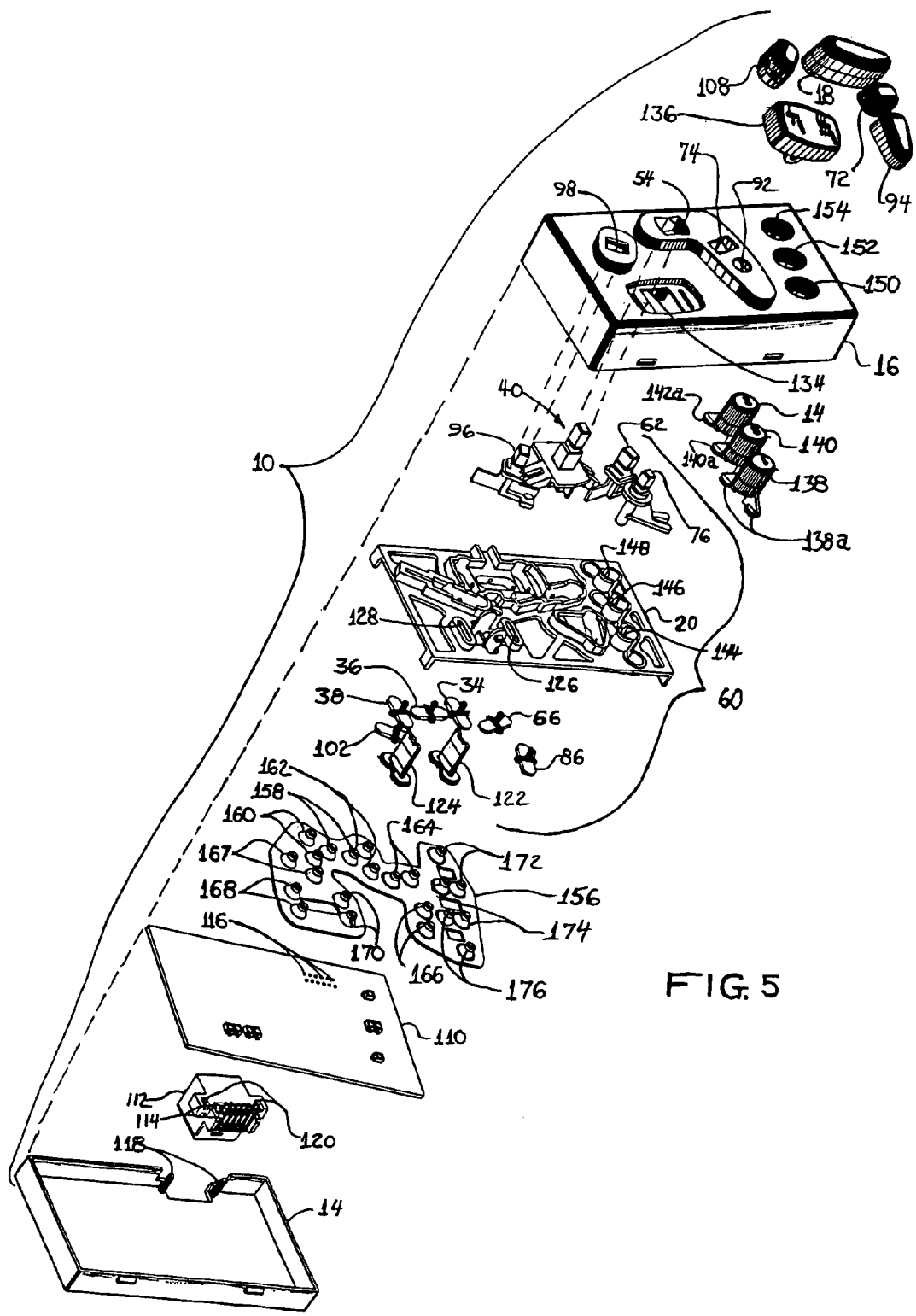

Referring to FIG. 5, a circuit board 110 is mounted in the lower housing shell 14; and, a connector terminal block 112 is mounted on housing shell 14 in a manner such that connectors 114 on the terminal block engage corresponding connector apertures 116 provided in the circuit board in the well-known pin and socket type connection. It will be understood that terminal block 112 has unshown receptacle pins provided thereon for enabling external electrical connection to the switch assembly 10. In the present practice of the invention projections 118 are provided in the housing for engaging corresponding apertures 120 provided in the terminal block to locate and retain the block on the housing shell 14.

Referring to FIGS. 1 and 4, a pair of auxiliary switch actuators of the sliding type, denoted by reference numerals 122, 124, are slidably received in guide slots 126, 128 provided in the platform 20. A pair of stanchions 130, 132 are disposed in spaced parallel arrangement and extend upwardly from platform 20 and through an opening 134 formed in the housing shell 16. A knob 136 is pivotally mounted on the stanchions 130, 132 and is operative upon pivotal movement to cause one or the other of the sliding actuators 122, 124 to move vertically downward in slots 126, 128 respectively.

Referring to FIGS. 4 and 5, a plurality of pushbutton actuators denoted by reference numerals 138, 140, 142 are slidably received through preferably arcuately configured guide walls denoted respectively 144, 146, 148 and through correspondingly located apertures (not visible in FIG. 4) through platform 20. Pushbutton actuators 138, 140, 142 also extend outwardly through apertures 150, 152, 154 respectively provided in the housing shell 16. Each of the pushbutton actuators 138, 140, 142 has a pair of generally flat projections extending from the lower end thereof in laterally spaced arrangement as denoted respectively by reference numerals 138a, 140a, 142a.

Referring to FIG. 5, a generally thin flat pad 156 has a plurality of dome-type elastomeric membrane switches disposed on the upper surface thereof and generally arranged in pairs for actuation by the levers 34, 36, 38, 66, 86, 102 and sliding actuators 122, 124, 138, 140, 142.

With continuing reference to FIG. 5, a pair of the membrane switches, preferably of the flexible dome type, 158 is disposed for actuation by lever 36; and, a second pair of membrane switches 160 is disposed directly below lever 38 for actuation thereby; and, a pair of dome switches 162 are disposed directly beneath lever 34 for actuation thereby. Thus, movement of seat knob 18 along the X axis moves actuator 40 to pivot levers 34, 38 to actuate one each of the pair of switches 160, 162 on the same side of the levers 34, 38. Movement of the actuator 40 in the opposite direction along the X axis will cause lever 34, 38 to pivot in an opposite direction and actuate the remaining one of each pair of the membrane switches 160, 162.

Sliding movement of the actuator 40 in the direction of the Y axis will cause lever 36 to actuate one of the membrane switches 158; and, sliding movement of the actuator 40 in the opposite direction along the Y axis will cause the lever 36 to be pivoted to actuate the remaining one of the pair of membrane switches 158.

Rotation of the actuator 40 in one direction about the Z axis will cause levers 34 and 38 to be pivoted simultaneously in mutually opposite directions thereby actuating oppositely disposed ones of each pair of the membrane switches 160, 162. Pivotal movement of the actuator 40 in an opposite direction about the Z axis will cause the levers 34, 36 to each pivot simultaneously in the opposite direction and opposite each other, thereby actuating the remaining opposite ones of the membrane switches 160, 162.

Sliding movement of the lumbar button 72 will cause actuator 62 to be slidably moved and effect pivoting of lever 66 for actuation of one or other membrane switches 164.

Pivotal movement of the actuator 76 in one direction causes movement of lever 86 and effects actuation of either one or the other of the membrane switches 166 for controlling the reclining of the seat back. Sliding movement of knob 108 effects sliding movement of actuator 96 and corresponding pivotal movement of lever 102 which results in actuation of one or the other of membrane switches 167 preferably for controlling servomotors to adjust the brake pedal.

A pair of membrane switches 168 is disposed on pad 156 directly beneath the sliding actuator 124; and, a pair of membrane switches 170 is also disposed on pad 156 directly beneath the sliding actuator 122 for actuation thereby. Pivotal movement of the knob 136 effects movement of one or the other of sliders 122, 124 and actuation respectively of one of the pairs of membrane switches 168, 170 which are preferably employed for controlling high or low level of energization of seat heater circuits.

User engagement and sliding movement of pushbutton 142 causes the pads 142a to effect actuation of the pair of membrane switches 172. User movement of actuator 140 causes pads 140a to effect actuation of the pair of membrane switches 174; and, user movement of actuator button 138 causes pads 138a to effect actuation of the pair of membrane switches 176. The switches 172, 174, 176 are preferably employed for activation and resetting of the seat position memory function.

Referring to FIG. 3, membrane switches 158 actuated by the lever 36 are shown in cross-section as having a flexible elastomeric dome 158a supported on pad 156 with each of the domes 158a supporting a moveable contact 158b operable to make contact with a stationary contact 158c provided on the pad 156. It will be understood that the construction of the membrane switches 158 is typical of the other membrane switches employed for actuation by the various levers.

It will be understood that pad 156 is mounted on circuit board 110 and each of the membrane switches is electrically connected to circuitry (not shown) on board 110 in a manner known in the art. Platform 20 is mounted over the board 110 and supports the various actuators and levers and is preferably assembled as a subassembly 60 prior to attachment of the upper housing shell 16 in engagement with the lower shell 14.

The present invention thus provides a multifunction switch assembly having a plurality of sealed dome type or membrane switches disposed on a circuit board and arranged in pairs such that a single actuator may be slidably moved in opposite directions along a first axis for actuating either one of a first pair of membrane switches and slidably moved in opposite directions along a second perpendicular axis for actuating either one of a second and third pair in the same direction for controlling desired operation of seat adjustment servomotors such as fore and aft movement and elevation movement control separately. Rotation of the knob about the third axis normal to the first two axes results in mutually opposite direction of actuation of the second and third pairs of membrane switches to effect operation of servomotors for an additional direction of adjustment of the passenger seat such as tilting. The actuator has a single portion extending from the switch housing to minimize contamination of the interior of the switch housing; and, the membrane switches provide for protection of the electrical contacts from foreign matter.

Although the invention has hereinabove been described with respect to the illustrated embodiments, it will be understood that the invention is capable of modification and variation and is limited only by the following claims.

The invention claimed is:

1. A multifunction switch assembly for use in controlling power adjusted vehicle seats comprising:
   (a) a platform member;
   (b) a plurality of levers pivotably disposed in a spaced array on said platform member; and,
   (c) a one-piece actuator moveably disposed on said platform member, and having certain portions operatively contacting three of said levers for effecting pivotal movement upon user manipulation thereof, wherein said actuator is disposed for sliding movement along a first axis and operative to effect pivotal movement of a first of said levers, said actuator being also disposed for sliding movement along a second axis substantially orthogonal to said first axis and operative thereupon to effect simultaneous pivotal movement of a second and third of said levers in the same direction, wherein said actuator is operative upon pivotal movement about a third axis normal to said first and second axes to effect pivotal movement of said second and third levers in opposition directions with respect to each other, and said actuator having another portion extending outwardly from said platform member for user manipulation thereof for effecting said movement about said first, second and third axes.

2. The switch assembly defined in claim 1, wherein each of said levers includes an actuation portion which is contacted by one of said certain portions of said actuator.

3. The switch assembly defined in claim 1, further comprising a pad member having a plurality of membrane switches mounted thereon.

4. The switch assembly defined in claim 3, wherein said pad member is attached to a circuit board.

5. The switch assembly defined in claim 1, further comprising a plurality of membrane type switches disposed in a spaced array corresponding to said levers, wherein each of said levers is operative upon pivotal movement in one direction for actuating one of a pair of said membrane switches and upon pivotal movement in a direction opposite said one direction operative for the other of said pair.

6. The switch assembly defined in claim 1, wherein said levers are mounted on one side of said platform member and said actuator is moveably mounted on a side opposite said one side.

7. The switch assembly defined in claim 1, wherein each of said levers includes a ball-like actuation portion contacting one of said certain portions of said actuator member.

8. The switch assembly defined in claim 1, wherein said another portion has an elongated knob attached thereto for facilitating user manipulation.

* * * * *